(12) United States Patent
Dodge et al.

(10) Patent No.: US 7,479,178 B2
(45) Date of Patent: Jan. 20, 2009

(54) DYE SETS FOR INKJET IMAGING AND INK SETS USING THE SAME

(75) Inventors: Tye J. Dodge, Corvallis, OR (US); Matthew Thornberry, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 238 days.

(21) Appl. No.: 11/348,899

(22) Filed: Feb. 6, 2006

(65) Prior Publication Data

US 2007/0181034 A1 Aug. 9, 2007

(51) Int. Cl.
*C09D 11/02* (2006.01)

(52) U.S. Cl. ............... 106/31.46; 106/31.47; 106/31.48; 106/31.49; 106/31.59

(58) Field of Classification Search .............. 106/31.46, 106/31.47, 31.48, 31.49, 31.59
See application file for complete search history.

(56) References Cited

U.S. PATENT DOCUMENTS

| | | | |
|---|---|---|---|
| 6,641,257 B1 | 11/2003 | Shi et al. | |
| 7,247,195 B2* | 7/2007 | Dodge et al. | 106/31.48 |
| 7,249,834 B2* | 7/2007 | Ozawa | 347/100 |
| 7,264,662 B2* | 9/2007 | Dodge et al. | 106/31.48 |
| 7,273,519 B2* | 9/2007 | Taguchi et al. | 106/31.48 |
| 7,279,033 B2* | 10/2007 | Yabuki et al. | 106/31.47 |
| 7,291,212 B2* | 11/2007 | Taguchi | 106/31.48 |
| 2004/0089200 A1 | 5/2004 | Fujiwara et al. | |
| 2004/0216638 A1 | 11/2004 | Rolly | |
| 2005/0004260 A1 | 1/2005 | Taguchi | |
| 2005/0011406 A1 | 1/2005 | Kabalnov et al. | |
| 2005/0087099 A1 | 4/2005 | Blease et al. | |
| 2005/0087100 A1 | 4/2005 | Blease et al. | |
| 2005/0088498 A1 | 4/2005 | Parazak et al. | |
| 2005/0132927 A1 | 6/2005 | Tateishi et al. | |
| 2007/0120928 A1* | 5/2007 | Ma et al. | 106/31.59 |
| 2008/0188595 A1* | 8/2008 | Deardurff | 524/88 |

FOREIGN PATENT DOCUMENTS

| | | |
|---|---|---|
| EP | 1464685 | 6/2004 |
| EP | 1462494 | 9/2004 |
| EP | 1475417 | 11/2004 |
| WO | 02083795 | 10/2002 |
| WO | WO 02/083795 A2 | 10/2002 |
| WO | 03062324 | 7/2003 |
| WO | WO 03/062324 A1 | 7/2003 |
| WO | WO 03/068873 * | 8/2003 |
| WO | 2005030886 | 4/2005 |
| WO | 2005030887 | 4/2005 |
| WO | 2005033211 | 4/2005 |
| WO | WO 2005/030886 A1 | 7/2005 |
| WO | WO 2005/030887 A1 | 7/2005 |
| WO | 2005105935 | 11/2005 |
| WO | 2006096841 | 9/2006 |

* cited by examiner

*Primary Examiner*—Helene Klemanski

(57) ABSTRACT

The present invention is directed to dye sets and ink formulated using the same, and in particular dye and ink sets for ink jet printing. The dyes/inks are configured to work in cooperation with one another to produce high quality printed images.

15 Claims, 5 Drawing Sheets

DYE SETS FOR INKJET IMAGING AND INK SETS USING THE SAME

FIELD OF THE INVENTION

The present invention generally relates to ink-jet printing, and in particular, to inkjet dye sets and ink sets with improved image quality performance.

BACKGROUND OF THE INVENTION

The use of digital image-forming apparatuses such as, for example, thermal ink-jet printers, large-format plotters, piezo-electric printers, large form plotters, laser printers, silver halide grade photo imaging apparatuses, and others has grown in recent years. The growth may be attributed to substantial improvements in print resolution and overall print quality coupled with appreciable reduction in cost, and ease of use. Today's image-forming apparatuses offer acceptable print quality for many commercial, business and household applications at costs lower than those offered in the past.

Perceived color quality can be characterized using any one of several color space systems, such as CIELAB or Munsell, as is well known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). Additional terms such as h.degree. (hue angle) and C*(chroma) are used to further describe a given color, as is known to those skilled in the art.

In general, a successful ink for color ink-jet printing must have the following properties: good crusting resistance, good stability, the proper viscosity, the proper surface tension, good color-to-color bleed alleviation, rapid dry time, no negative reaction with the vehicle, consumer-safety, and low strike-through. When placed into a thermal ink-jet system, the ink set must also be kogation-resistant. However, a single ink-jet colorant and/or ink, which has good chroma, gamut, hue angle, and environmental robustness (e.g., air-fastness, light-fastness, water-fastness) is not always optimal for use with other colorants and/or ingredients of that ink, or other inks with which it is used in combination. In other words, not only does an individual colorant and/or ink (e.g., cyan, magenta, or yellow ink), have to independently have acceptable color qualities, but it should also work well when used as part of a dye and/or ink set.

Accordingly, it would be desirable to provide colorant and inks for use in ink jet printing, which when used individually as well as synergistically and in combination with other dyes and inks, have improved print quality, reliability performance, and environmental robustness.

SUMMARY

The present invention is directed to dye sets and inks formulated using the same, and in particular dye and ink sets for ink jet printing. The dyes of the present invention and inks formulated using the same, are particularly selected for use as a set to provide an optimal color performance.

In an embodiment, dye and ink sets comprise a cyan dye (or ink) containing a phthalocyanine compound represented by Formula I and configured for use as part of a dye (or ink) set with another dye (or ink) being a magenta dye (or ink) containing an azo dye according to Formula III, a magenta dye (or ink) containing an azo dye represented by Formula III and configured for use as part of a dye (or ink) set with another dye (or ink) being a cyan dye (or ink) containing a phthalocyanine compound represented by Formula I, or both the cyan and the magenta dye (or inks); wherein at least one dye (or ink) is formulated to work in cooperation with the other dye (or ink) to enhance properties of the printed image:

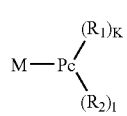

FORMULA I

Wherein

M represents a hydrogen atom, a metal atom; or an oxide, hydroxide, or halide thereof; and Pc represents a phthalocyanine nucleus;

$R_1$ and $R_2$ each independently represents a substituent selected from the group consisting of $-SOX_1$, $-SO_2X_1$, $SO_2NX_2X_3$, $-SO_3X_4$;

$X_1, X_2, X_3$, and $X_4$ each independently represents a hydrogen atom, a substituted or unsubstituted alkyl group, a substituted or unsubstituted aryl group, or a substituted or unsubstituted heterocyclic group;

at least one of $R_1$ or $R_2$ has an ionic hydrophilic group as a substituent; and k and l each independently represents an integer ranging from 1 to 3, provided that k and l each independently is selected such that k+l equals 4; and Wherein Formula III is shown below:

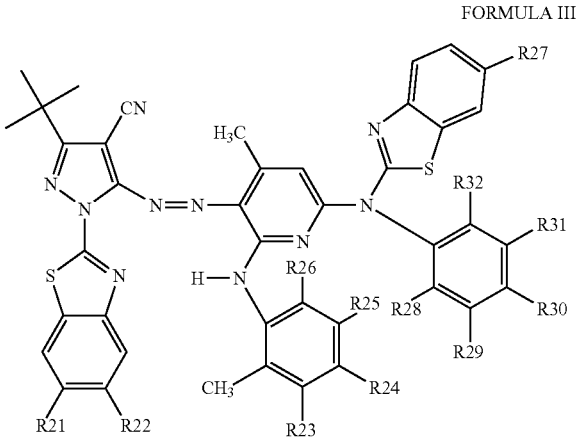

FORMULA III wherein $R_{21}, R_{23}, R_{25}, R_{27}, R_{29}$, and $R_{31}$, are independently selected to be hydrogen atom or sulfonate group;

$R_{22}$ is selected to be hydrogen atom or nitro group;

$R_{26}$ and $R_{28}$ are independently selected to be hydrogen atom or methylgroup;

$R_{24}$ and $R_{30}$ are independently selected to be a methyl or sulfonate group; and $R_{32}$ is selected to be a methyl or methoxy group.

DETAILED DESCRIPTION OF EMBODIMENTS OF THE INVENTION

Figure 1A:
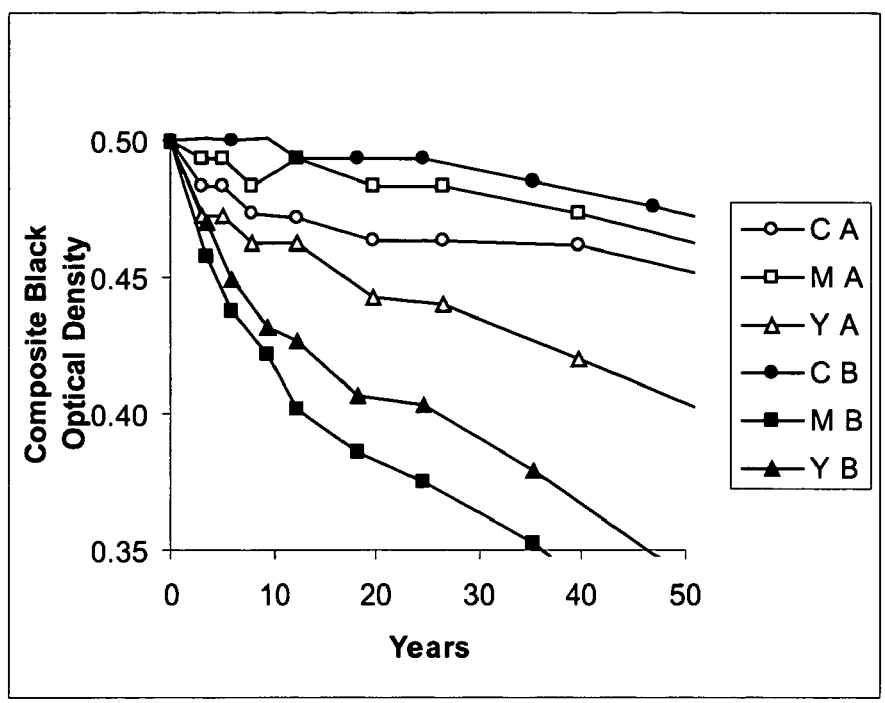
FIGS. 1A through 3B are graphical representations of the performance of various ink sets after exposure to light.
Figure 1B:
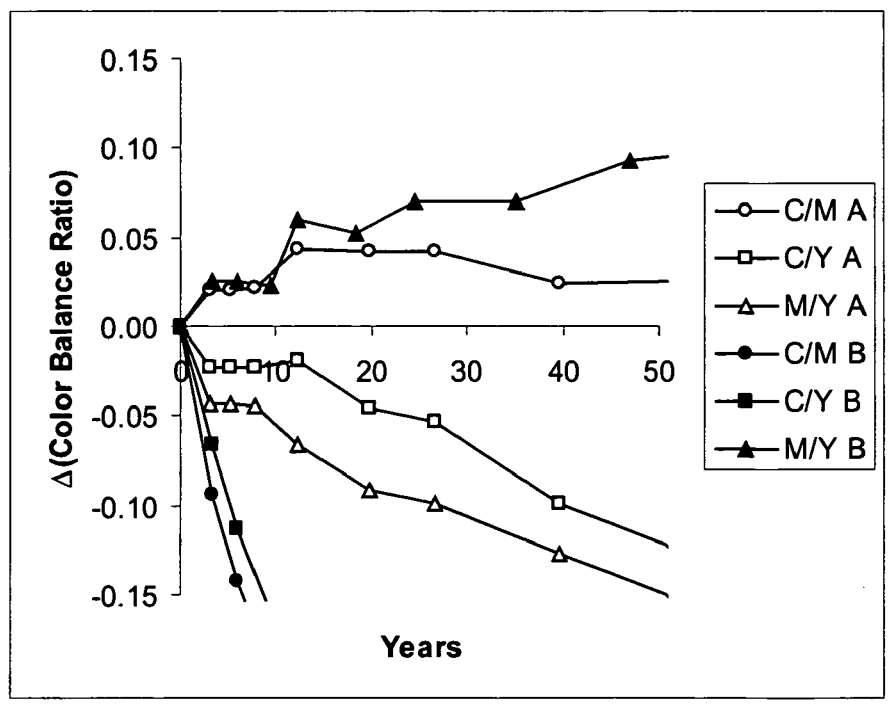
Figure 2A:
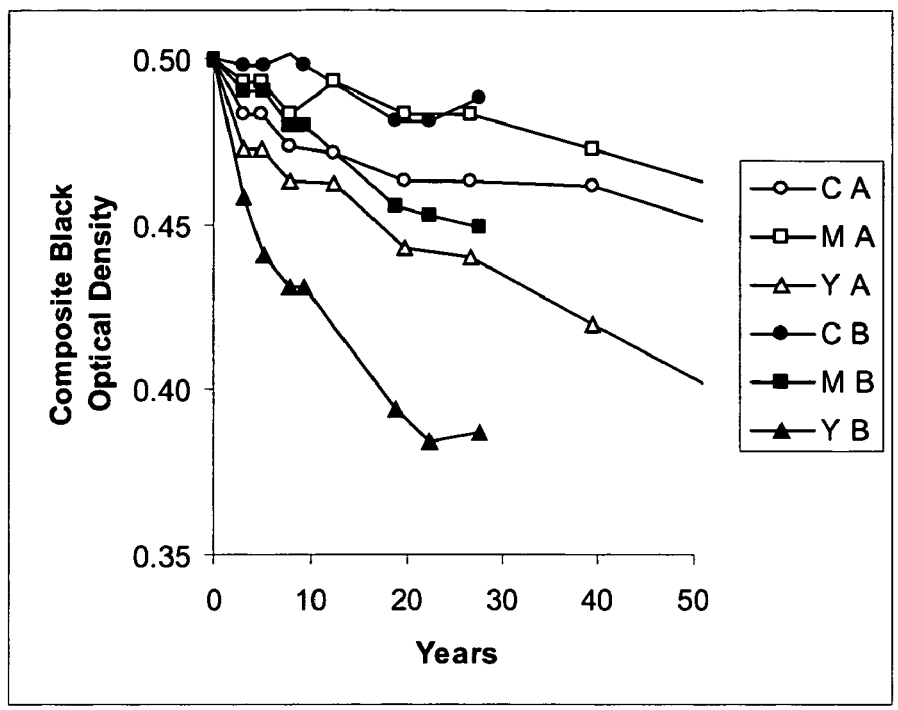
Figure 2B:
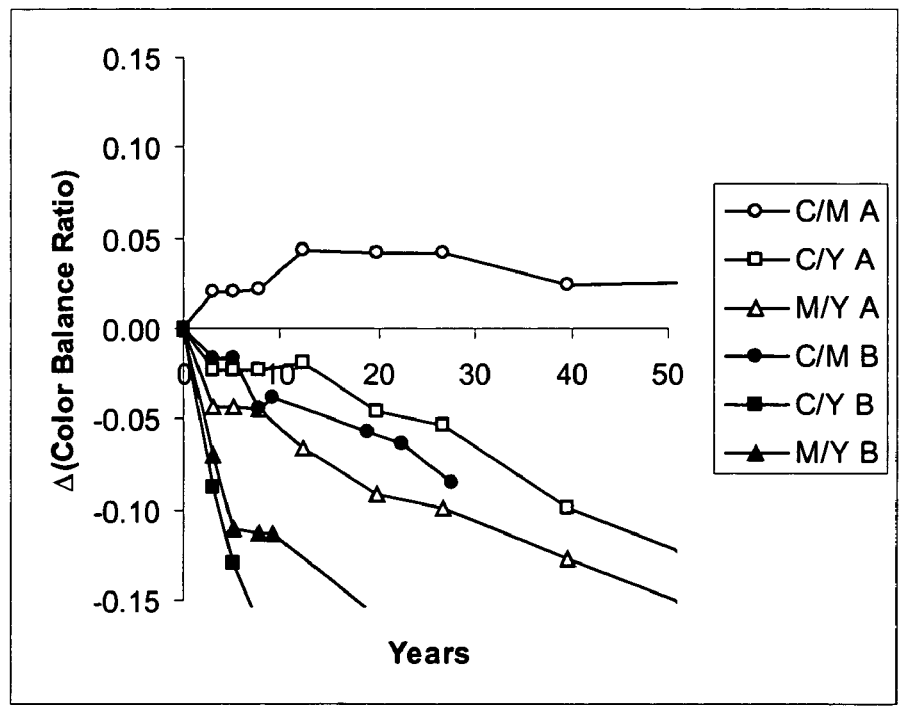

The present invention is directed to dye sets and ink sets using the same, in inkjet printing (e.g. either or both piezo-electric and thermal inkjet apparatus). In an embodiment, the dye and the ink sets of the present invention, are formulated for use in thermal inkjet printing systems such as the DESK-JET®, DESIGNJET®, and PHOTOSMAR® family of printers commercially available from the Hewlett-Packard Company of Delaware. The dye and ink sets of the present invention are particularly useful for imaging and photo printers, including commercial printers. The inks of the present invention are useful for printing on porous, non-porous, and hybrid glossy media and semi-glossy media, in particular porous media for use in commercial printing applications such as graphic arts and photo retail requiring high throughput and high image quality as well as home photo printers. Exemplary print media include, but are not limited to, Hewlett-Packard Advanced glossy Photo Paper, Ilford Galerie Pearl Photo Inkjet Paper (semi-gloss), Epson Premium Glossy Photo Paper, and Pictorico Photo Gallery glossy paper.

It should be appreciated by those skilled in the art that while concentrations, amounts, and other numerical data may be expressed or presented herein in a range format, such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

As used herein, "vehicle" refers to a liquid in which colorant is dispersed to form an ink. Ink vehicles are well known in the art, and a wide variety of ink vehicles may be used with the sets, systems and methods of the present invention. Such ink vehicles may include a mixture of a variety of different agents, including but not limited to, surfactants, solvents, co-solvents, buffers, biocides, sequestering agents, viscosity modifiers, surface-active agents, and water.

As used herein, the term "dispersed" refers to any mechanism by which a component, such as the colorant, is dispersed, dissolved, solubilized, mixed, or otherwise is made able to be carried by the vehicle. The term "colorant" as used herein, refers to dyes, pigments, and/or dispersed dyes.

When discussing various embodiments of the present invention, such embodiments can apply to either or both the dye set and the ink set, unless indicated otherwise. For purposes of brevity and clarity, hereinafter, inks and ink sets will be further used to describe the various embodiments including features of the present invention but which are applicable to both dye sets and ink sets. As used herein, the term dye and/or the ink set refers to either or both dye/s and/or the ink/s which are formulated to work in cooperation with other dyes and/or inks; and dye set and/or ink set which comprise a plurality of dyes and/or inks, respectively, which work together in cooperation in order to provide enhanced performance.

As used herein, "effective amount" refers to at least the minimal amount of a substance or agent, which is sufficient to achieve a desired effect. For example, an effective amount of an ink vehicle is at least the minimum amount required in order to form an ink composition, while maintaining properties necessary for effective ink-jetting. The term "substantially" when used with another term shall include from mostly to completely.

All concentrations herein are in weight percent of total ink composition, unless otherwise indicated. The purity of all components is that employed in normal commercial practice for ink-jet inks.

In an embodiment, the ink formulations, embodying features of the present invention for use as part of an ink set, include at least one dye of a given hue (e.g., cyan, magenta, yellow) dispersed in the ink vehicle ink.

As used herein, the term "set" refers to a set of dyes or inks formulated using the same, whether packaged or made available as part of a set, or packaged and made available separately for use with other members of the set. For purposes of description hereinafter, the term set will be used to further describe the present invention, although it should be appreciated by those skilled in the art, that the components of the set (e.g., dyes or inks formulated using the dyes) may be packaged or made available separately for use as a set.

In an embodiment, the ink set comprises at least one ink including either the cyan ink having a cyan dye according to the present invention and configured for use as part of a set with a magenta ink having a magenta dye according to the present invention, or a magenta ink including a magenta dye according to the present invention and configured for use as part of a set with a cyan ink having a cyan dye according to the present invention; wherein the at least one ink is formulated to work in cooperation with the other ink to enhance the properties of the printed image. In an embodiment, the ink set includes both the cyan and the magenta inks. In an embodiment, the ink set further includes a yellow ink including a yellow dye according to the present invention. Each of these dyes usable in the dye or ink set of the present invention will be further described below.

In an embodiment, each ink color may further include other colorants suitable for use in that color ink.

The dyes and/or the inks are formulated to work in cooperation with at least one other dye and/or ink in the set to create images with improved inkjet performance. In an embodiment, such improvement comprises enhancement of "fastness" of the printed image, such as light and/or ozone fastness. In an embodiment, improvement resulting from the dye and/or the ink formulated to work in cooperation as a set, provides for a more uniform fade (e.g., fade due to ozone, light, or other environmental conditions). As used herein, the term "fastness" refers to that property of the printed image which helps maintain its color characteristics (e.g., Hue, Value, Chroma) which may include light-fastness, ozone-fastness, water-fastness, or a combination thereof. As used herein the term "fade" refers to fading of the colored image due to environmental conditions such as ozone, light, water, or combinations thereof.

The dye set of the present invention, and inks sets using the same, provide printed images having a high print quality and printing system reliability, while enabling printed images having improved environmental robustness, such as enhanced resistance to ozone-induced fade and water-resistance. In an embodiment, images produced using combination of at least two of the inks according to the present invention (e.g., any two of cyan, magenta, and yellow), fade in a more uniform fashion.

According to an embodiment having features of the present invention, the cyan ink comprises at least one cyan dye generally having Formula I. The cyan ink (or cyan dye) may comprise additional colorants. In an embodiment, the cyan ink further includes at least one additional dye, such as Direct Blue 199 (DB199), Direct Blue 86 (DB86), Direct Blue 87 (DB87), Direct Blue 307 (DB307), or Acid Blue 9 (AB9); preferably the latter. Preferably, sodium salt of AB9 is used.

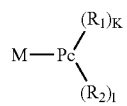

FORMULA I

Wherein

M represents a hydrogen atom, a metal atom; or an oxide, hydroxide, or halide thereof; and Pc represents a phthalocyanine nucleus;

$R_1$ and $R_2$ each independently represents a substituent selected from the group consisting of —$SOX_1$, —$SO_2X_1$, $SO_2NX_2X_3$, —$SO_3X_4$;

$X_1$, $X_2$, $X_3$, and $X_4$ each independently represents a hydrogen atom, a substituted or unsubstituted alkyl group, a substituted or unsubstituted aryl group, or a substituted or unsubstituted heterocyclic group;

at least one of $R_1$ or $R_2$ has an ionic hydrophilic group as a substituent; and k and l each independently represents an integer ranging from 1 to 3, provided that k and l each independently is selected such that k+l equals 4.

In an embodiment, $R_1$ equals —SO—$(CH_2)_3$—$SO_3Z$, or —$SO_2$—$(CH2)_3$—$SO_3Z$; $R_2$ equals —$SO_2$—$(CH_2)_3$—$SO_2NH$—$C_2H_4OC_2H_4OH$, or —$SO_2$—$(CH_2)_3$—$SO_2NH$—$CH_2CH(OH)CH_3$; k is from 2 to 3. In an embodiment, Z is lithium, sodium, potassium, ammonium, tetramethylammonium, or a mixture thereof. In an embodiment, Z is lithium or potassium. In an embodiment, Z is lithium.

In an embodiment, $R_1$ equals —$SO_2$—$(CH_2)_3$—$SO_3Z$; $R_2$ equals —$SO_2$—$(CH_2)_3$—$SO_2NH$—$CH_2CH(OH)CH_3$; and k is 3. In an embodiment, Z also is lithium.

R, preferably, is introduced in any one or more of the benzene rings A through D at the β-position.

The phthalocyanine dyes embodying features of the present invention, can be prepared according to methods generally known in the art as for example those described in published PCT application WO 03/062324. By way of example, an embodiment of such dye may be synthesized from Lithium 3-(3,4-dicyanophenylsulfonyl) propanesulfonate, 3-(3,4-Dicyanophenylsulfonyl)-N-(2-hydroxypropyl) propanesulfonamide and Cupuric Chloride. This exemplary reaction as indicated as Equation I is described as follows wherein the molar concentrations of the reactants are 3:1; and A with R=$R_1$=$SO_2(CH_2)_3SO_3Li$ and B with R=$R_2$=$SO_2(CH_2)_3SO_2NHCH_2CH(OH)CH_3$).

EQUATION I

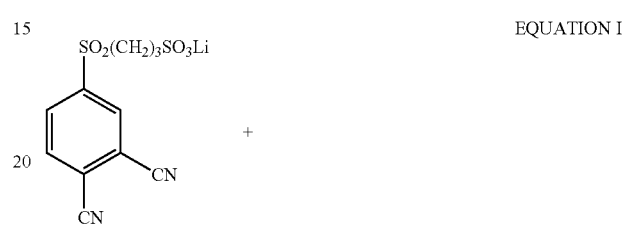

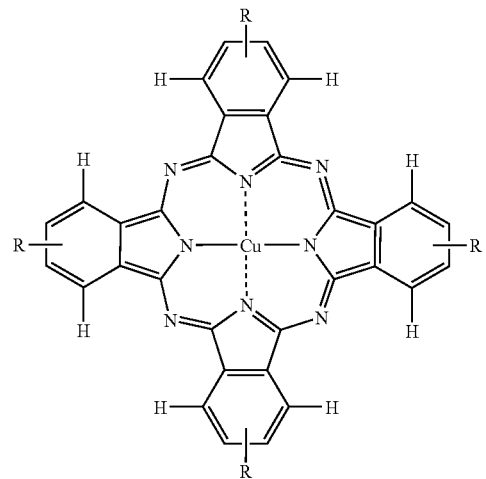

Table I below, provides exemplary phthalocyanine dyes according to the present invention, wherein the substituents $R_1$ and $R_2$ each is introduced in an irregular site order within the β-position substitution. However, it should be appreciated by those skilled in the art, that although the preferred dye has the R substituent at the β-position, the dye and the ink containing the same, may further include the same basic nucleus with the R substituent at different positions such as the α-position; as well as other dyes. In the exemplary dyes shown in Table I, M is copper (Cu).

TABLE I

| Cyan Dye | $R_1$ | K | $R_2$ | I |
|---|---|---|---|---|
| C1 | —SO—$(CH_2)_3$—$SO_3K$ | 3 | —$SO_2$—$(CH_2)_3$—$SO_2NH$—$C_2H_4OC_2H_4OH$ | 1 |
| C2 | —$SO_2$—$(CH2)_3$—$SO_3K$ | 2 | —$SO_2$—$(CH_2)_3$—$SO_2NH$—$C_2H_4OC_2H_4OH$ | 2 |
| C3 | —$SO_2$—$(CH2)_3$—$SO_3Li$ | 3 | —$SO_2$—$(CH_2)_3$—$SO_2NH$—$CH_2OCH(OH)CH_3$ | 1 |
| C4 | —$SO_2$—$(CH2)_3$—$SO_3Li$ | 2.7 | —$SO_2$—$(CH_2)_3$—$SO_2NH$—$CH_2OCH(OH)CH_3$ | 1.3 |
| C5 | —$SO_2$—$(CH2)_3$—$SO_3Li$ | 2 | —$SO_2$—$(CH_2)_3$—$SO_2NH$—$CH_2OCH(OH)CH_3$ | 2 |

According to an embodiment having features of the present invention, the magenta ink comprises at least one magenta dye generally having Formula II. The magenta ink (or magenta dye) may comprise additional colorants.

FORMULA II

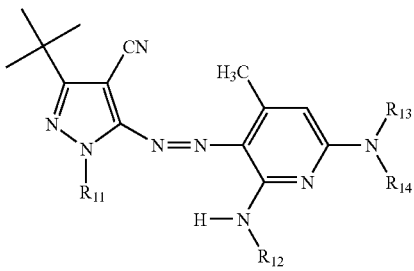

In an embodiment, Formula II is represented by Formula III, below:

FORMULA III

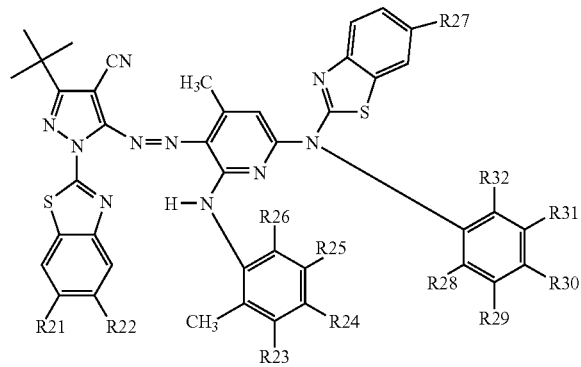

Wherein $R_{21}$, $R_{23}$, $R_{25}$, $R_{27}$, $R_{31}$, and $R_{29}$ are independently selected to be hydrogen atom or sulfonate group;

$R_{22}$ is selected to be hydrogen atom or nitro group $R_{26}$ and $R_{28}$ are independently selected to be hydrogen atom or methyl group;

$R_{24}$ and $R_{30}$ are independently selected to be a methyl or sulfonate group;

$R_{32}$ is selected to be a methyl or methoxy group.

In an embodiment, in Formula III, $R_{21}$, $R_{23}$, $R_{27}$, and $R_{29}$ are sulfonate groups; $R_{22}$, $R_{25}$, and $R_{31}$ are hydrogen atoms; and $R_{24}$, $R_{26}$, $R_{28}$, $R_{30}$, and $R_{32}$ are methyl groups. In an embodiment, the sulfonate group is a salt of lithium, sodium, potassium, ammonium, tetramethylammonium, or a mixture thereof. In an embodiment, the sulfonate group is a salt of potassium.

Table II below provides exemplary azo dyes according to the present invention:

TABLE II

| Mag. Dye ID | $R_{11}$ | $R_{12}$ | $R_{13}$ | $R_{14}$ |
|---|---|---|---|---|
| M1 | benzothiazole-$SO_3K$ | trimethylphenyl-$SO_3K$ | benzothiazole-$SO_3K$ | trimethylphenyl-$SO_3K$ |
| M2 | benzothiazole-$SO_3Na$ | methylphenyl-$SO_3Na$ | benzothiazole-$SO_3Na$ | methylphenyl-$SO_3Na$ |

TABLE II-continued

| Mag. Dye ID | R11 | R12 | R13 | R14 |
|---|---|---|---|---|
| M3 | 2-methylbenzothiazole | 3,5-dimethyl-4-SO₃K-phenyl | 2-methylbenzothiazole | 3,5-dimethyl-4-SO₃K-phenyl |
| M4 | 2-methylbenzothiazole | trimethyl-bis(SO₃K)-phenyl | 2-methylbenzothiazole | trimethyl-bis(SO₃K)-phenyl |
| M5 | 5-NO₂-2-methylbenzothiazole | 2-methyl-4-SO₃K-phenyl | 6-SO₃K-2-methylbenzothiazole | 2-OCH₃-5-SO₃K-phenyl |

In an embodiment, at least one of the inks (e.g., the cyan ink), may further include a phenylenediamine compound derivative having generally Formula IV and having the CA Index name Ethanesulfonic acid, 2,2'-[1,3-phenylenebis [imino[6-[bis(2-hydroxyethyl)amino]-1,3,5-triazine-4,2-diyl]imino]]bis-, disodium salt. The presence of the phenylenediamine compound derivative acts as a deflocculant reducing the unwanted aggregation of the dyes in the ink. In an embodiment, the diphenylamine additive improves the quality of the printed images, in particular on swellable media by reducing coalescence and bronzing of the ink on the printing medium. This phenylenediamine compound derivative is further described in European Patent Publication EP1514913A2.

FORMULA IV

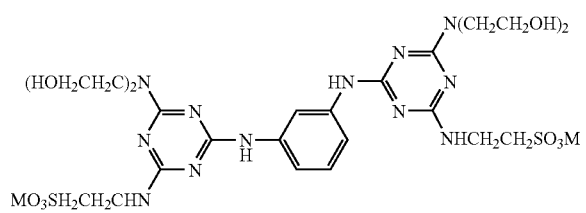

In an embodiment, when present, the phenylenediamine compound derivative may be added to each ink in an amount generally ranging from about 0.2 to about 10%, from about 0.5 to about 5%, from about 1.5 to about 2.5%, by weight, based on the total weight of the ink (with the wt % numbers for the phenylenediamine compound derivative corrected for the % active ingredients).

According to an embodiment having features of the present invention, the yellow ink comprises at least one azo yellow dye, generally available from Ilford Imaging (Australia) Pty Ltd., under the trade name ILFOJET Yellow, or YELLOW Y-1189, generally having Formula V; and having the CA index name of 1,3-naphthalenedisulphonic acid, 7-[[4-[[4,6-bis-[(3-sulfoprop-1-yl)thio]-1,3,5-triazin-2-yl]amino]-3-methoxyphenyl]azo] tetrasodium salt; and molecular formula $C_{26}H_{24}N_6O_{13}S_6Na_4$.

FORMULA V

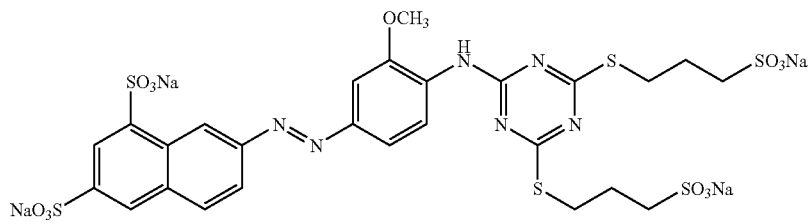

The colorant, in the ink (dyes according to the present invention and other optionally additional colorants including other dyes, pigments, dispersed dyes, or combination thereof), may be added to each ink, in total, in an amount generally ranging from about 0.1 to about 10%, from about 2 to about 8%, from about 4 to about 6%, by weight, based on the total weight of the ink. In an embodiment, the dyes according to the present invention (e.g., cyan of Formula I, Magenta of Formula III, and Y1189) may be added, independently, in an amount ranging from about 1 to about 10 wt %, from about 2 to about 8 wt %, or from about 4 to about 6 wt %. In an embodiment, the AB9 is added to the cyan ink in an amount ranging from about 0.01 to about 1 wt %, from about 0.05 to about 0.5 wt %, from about 0.05 to about 0.2 wt %.

The vehicle for the ink may comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed. Representative water-soluble organic solvents that may be selected are disclosed in U.S. Pat. No. 5,085,698.

A typical ink vehicle formulation usable in formulating the inks of the present invention may include one or more solvent or co-solvents, which may be added to each ink, in total, in an amount generally ranging from about 1% (wt %) to about 50%; from about 2 to about 45 wt %, or from about 5 to about 35 wt %.

Classes of solvents or co-solvents that may be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, tetraethylene glycol; 2-pyrrolidinone; 1,5-pentanediol; and 2-ethyl-2-(hydroxymethyl)-1,3-propanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, as well as fluorocarbon surfactants such as those formed at least in part from a polymer made based on oxetane chemistry having the Formula VI below

FORMULA VI

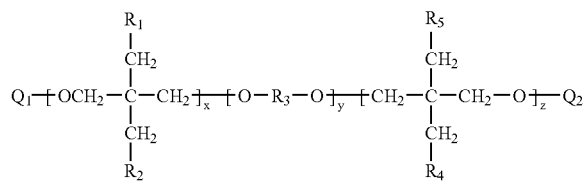

Wherein
$Q_1$ and $Q_2$ are independently selected from the group consisting of H, $SO_3^-W^+$, $COO^-W^+$, and COOH and wherein W is selected from the group consisting of $NH_4$, Li, Na, and K;
$R_1$ and $R_2$, are independently selected from the group consisting of H and OH;
$R_4$, and $R_5$ are independently selected from the group consisting of $O(CH_2)_m$—$(CF_2)_n$—$CF_3$ wherein m=1-3 and n=0-3;
$R_3$ is selected from the group consisting of $(CH_2)_L$ and

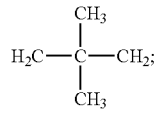

L=1-4; x=1-10; y=1-30; and z=1-10.

In an embodiment, the oxetane-based fluorocarbon surfactant is formed from at least a polymeric material having L=4; m=1; n=1; and $R_2$ and $R_4$=H.

Examples of suitable oxetane-based fluorocarbon surfactants include, but are not limited to those generally available from companies such as Omnova Solutions, Inc. of Fairlawn, Ohio under the trade name of PolyFox® fluorocarbon surfactants. Exemplary PolyFox® surfactants include PolyFox PF-136A, PolyFox PF-151N, PolyFox PF-154N, and PolyFox PF-156A, PolyFox AT-1121.

Examples of nonionic and amphoteric surfactants include TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide/polypropylene oxide block copolymers; SURFYNOL® compounds, which are acetylenic polyethylene oxides available from Air Products (Allentown, Pa.); anionic surfactants such as members of the DOWFAX™ family of diphenyl sulfonate derivatives available from the Dow Chemical Company, and the CRODAFOS™ family of phosphate esters available from Croda Incorporated; polyethylene oxide ("POE") esters; POE diesters; POE amines; POE amides; and dimethicone copolyols.

In an embodiment, when present, the one or more, non-fluorinated surfactant may generally be added, independently, to each ink in an amount ranging from about 0.01 to about 5.0 wt. %, from about 0.1 to about 3.0 wt %, from about 0.2 wt % to about 2.0 wt %; 0.2 to about 1.0 wt %; based on the total weight of the ink; with a total amount, independently for each ink, ranging from about 0.1 to about 10 wt %, from about 0.2 to about 6.0 wt %, from about 0.4 to about 4.0 wt %, from about 0.4 to about 2 wt %.

The fluorinated surfactant, when present, may generally be added to the ink in an amount ranging, from about 0.0005 to about 5.0 wt %, from about 0.0005 to about 2 wt %, from about 0.01 wt. % to about 5.0 wt. %, from about 0.05 to about 1.0 wt %, from about 0.1 to about 1.0 wt %, from about 0.2 wt % to about 0.6 wt %, of the total weight of the inkjet ink (with the wt % numbers for the fluorinated surfactant corrected for the % solids).

Consistent with the invention, various types of additives, may be employed in the inks (or the performance optimizing liquid) to optimize the properties of the ink compositions for specific applications. The remainder of the ink compositions is mostly water; however, other independently selected components including surfactants, humectants, anti-kogation additives, anti-corrosive additives, polymers, preservatives, biocides that inhibit growth of microorganisms (such as the preservative PROXEL™ GXL available from Avecia Incorporated); chelating agents (or sequestering agents) such as EDTA that eliminate deleterious effects of heavy metal impurities; buffers to maintain the ink at a desired pH (such as Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO")); and viscosity modifiers, may be added to improve various properties of the ink composition.

EXAMPLES

The general composition of exemplary inkjet inks made according to the present invention is shown in TABLE III, along with exemplary ranges of amount of ingredients making up each component. The inkjet ink may be cyan, magenta, yellow, or black, depending on the colorant that is used. Each ink may include one or more colorant at independently selectable concentrations, hues, values, and chromas. The pH of the inks were adjusted, as necessary with either NaOH or $HNO_3$.

TABLE III

| Ingredient | Amount added to make the wt % |
|---|---|
| Colorant | about 0.1 to about 10; about 2 to about 8; about 4 to about 6 |
| Water soluble organic solvent (total) | about 1 to about 50; about 2 to about 45; about 5 to about 35 |
| Buffer | about 0 to about 2.0; about 0.1 to about 0.3; about 0.15 to about 0.25 |
| Preservative/biocide | about 0 to about 2.0; about 0.02 to about 0.20; about 0.05 to about 0.15 |
| Non-Fluoro Surfactant (total) | about 0.1 to about 10; about 0.2 to about 6; about 0.4 to about 2 |
| Fluoro Surfactant (total) | about 0.01 to about 5 about 0.1 to about 1.0; about 0.2 to about 0.6 |
| Sequestering Agent | about 0 to about 2.0; about 0.02 to about 0.20; about 0.05 to about 0.15 |
| Water | Substantially the remainder |

More specific examples of formulations for the various inks included one or combination of: tetraethylene glycol; 2-pyrrolidinone; 1,5-pentanediol; and 2-ethyl-2-(hydroxymethyl)-1,3-propanediol; Tergitol 15-S-7; Dowfax 8390, Polyfox AT-1121; EDTA; Trizma base; Proxel GL; water; and colorant. The colorants included, Yellow Y1189, cyan dye according to Formula I and AB9, and magenta dye according to Formula III.

Inks were formulated according to the present invention, and different performance attributes of the formulated inks were observed or measured and, in an effort to assess the benefits attained in the practice of the invention, such as the effect of the inks as a set on fastness, in particular ozone-fastness, and light-fastness, while maintaining or improving other print and/or pen attributes. Examples of the some specific formulations are shown in Table IV. Inkjet pens were filled with the ink samples made according to the present invention and the inks were compared against other commercially available ink sets including Canon IP3000, Canon Selphy DS700, and Olympus P-10. Diagnostic plots for (1) inks made according to the present invention were printed on HP Advanced Photo Paper and (2) Canon IP3000 and Canon Selphy DS700 were printed on Canon Photo Paper Pro or Canon Photo Paper Plus. The Olympus P-10 is a dye sublimation printer and does not require ink jet media.

TABLE IV

| | WT. % ADDED | | |
|---|---|---|---|
| INGREDIENT | Cyan | Magenta | Yellow |
| Dye | Dye of Formula I (4-6%) AB9 (<0.5%) | Dye of Formula III (4-6%) | Y-1189 (4-6%) |
| Organic solvent (one or more) | | | |
| 2-pyrrolidinone (2P) 1,5 pentanediol (1,5-PD) 2-Ethyl-2-(hydroxymethyl)-1,3-propanediol (2E2HPD) Tetraethylene glycol (TEG) | 0 to 15%; 7-15% | 0 to 15%; 7-15%) | 0 to 20%; 10-20%) |
| Surfactant (one or more) | | | |
| Tergitol 15-S-7 Dowfax 8390 MOPS | 0.2-2% | 0.2-3% | 0.2-2% |
| Polyfox AT-1121 | | 0.2-0.6% | |
| Sequestering Agent | 0.05-0.25% | 0.05-0.25 | 0.05-0.25% |
| Buffer | 0.15-0.45% | 0.15-0.45% | 0.15-0.45% |
| Biocide | 0.05-0.15% | 0.05-0.15% | 0.05-0.15% |
| Anti-Flocculant | diphenylamine compound of Formula IV (1.-3%) | | |
| Water | balance | balance | balance |

The diagnostic plots included blocks of composite black (a plot generated using a combination of cyan, magenta, and yellow inks) with an initial optical density of 0.5.

Two main criteria were evaluated: (1) optical density fade and (2) hue shift (e.g. change in color balance). The first set of plots evaluated the optical density fade where a thirty percent (30%) optical density loss (OD=0.35) was regarded as an objectionable optical density fading. The second set of plots compared the color balance change of three color ratios (C/M, C/Y, M/Y) where a ratio >0.15 or <−0.15 was regarded as an objectionable hue shift.

Light fade exposures were conducted under glass at approximately 23-27° C., 42-44% RH, and 60-80 kLux with 1971 kLux*hrs being considered equivalent to one (1) year of real time exposure. Ozone exposures were conducted at 25° C., 50% RH (relative humidity), and 1 ppm ozone, with 40 ppm*hrs being considered equivalent to 1 one (1) year of real time exposure. All color measurements were performed with a D65 illuminant and a (two) 2 degree observer. The cyan, magenta, and yellow optical densities were measured with red, green, and blue filters, respectively.

Figure 3A:
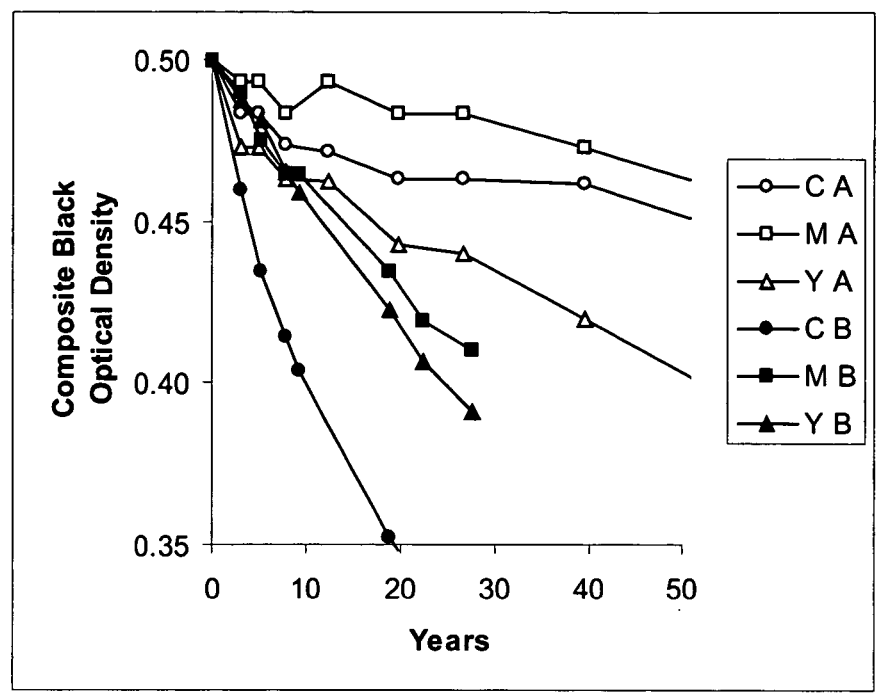
Figure 3B:
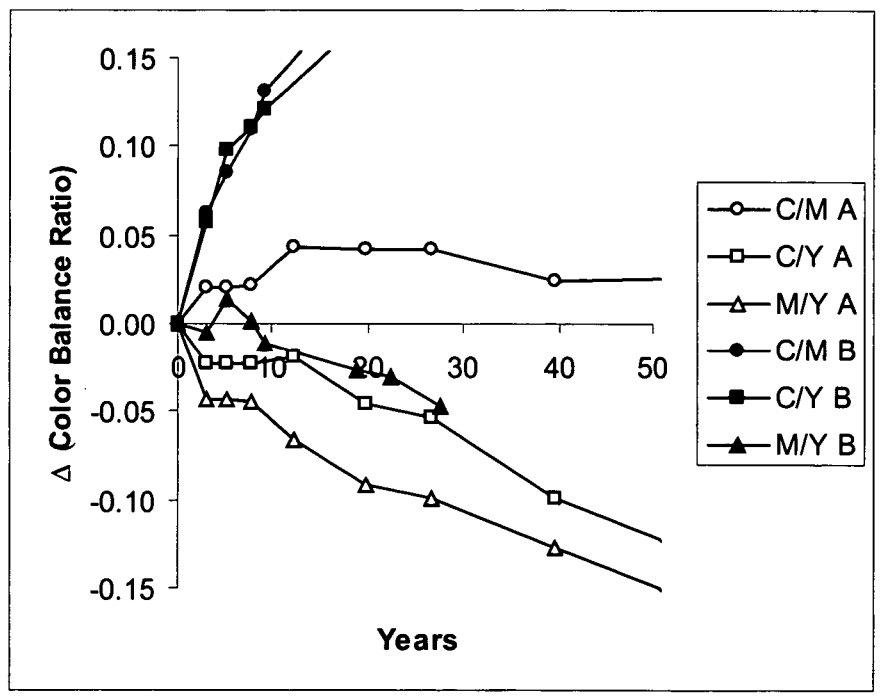

The results for light-fade are reported in FIGS. 1A through 3B. FIGS. 1A, 2A, and 3A represent the data obtained as a result of the first set of plots while FIGS. 1B, 2B, and 3B represent the data obtained as a result of the second set of plots. In each Figure, data denoted as "A" represents ink sets made according to the present invention; data denoted as "B" represents the comparative ink set; and "C","M",and "Y," represent, Cyan, Magenta, and Yellow; respectively. Comparative samples "B" in FIGS. 1 (A and B) through 3 (A and B), refer to Canon IP3000, Canon Selphy DS700, and Olympus P-10, respectively.

Figure 4A:
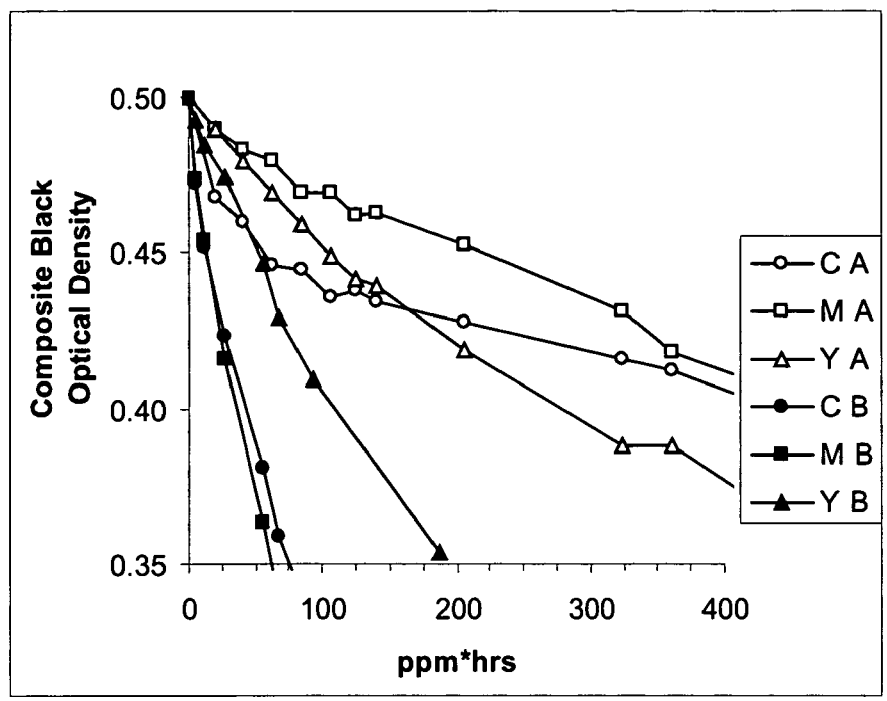
FIGS. 4A through 5B are graphical representations of the performance of various ink sets after exposure to ozone.
Figure 4B:
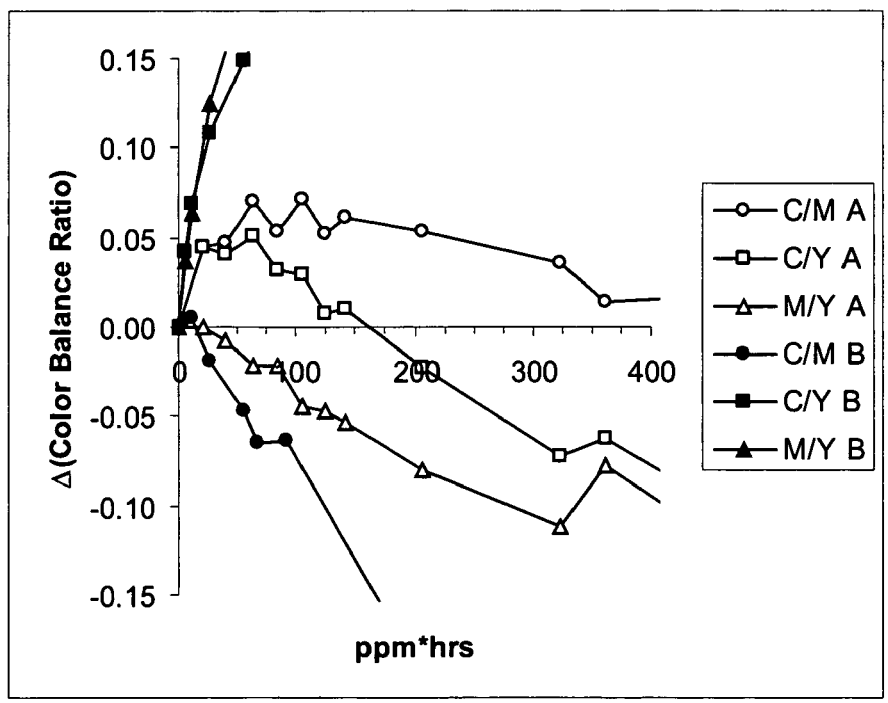
Figure 5A:
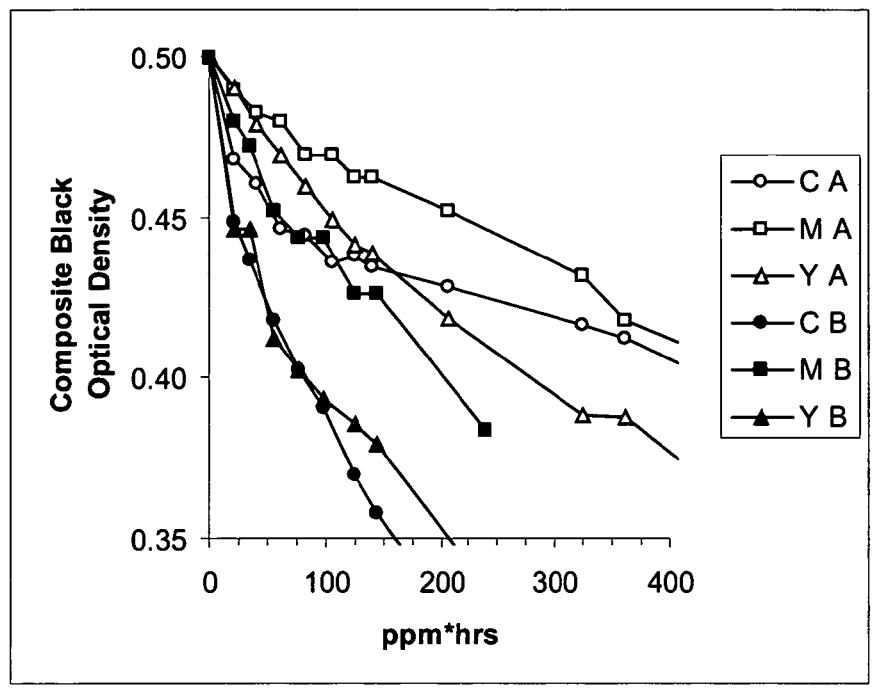
Figure 5B:
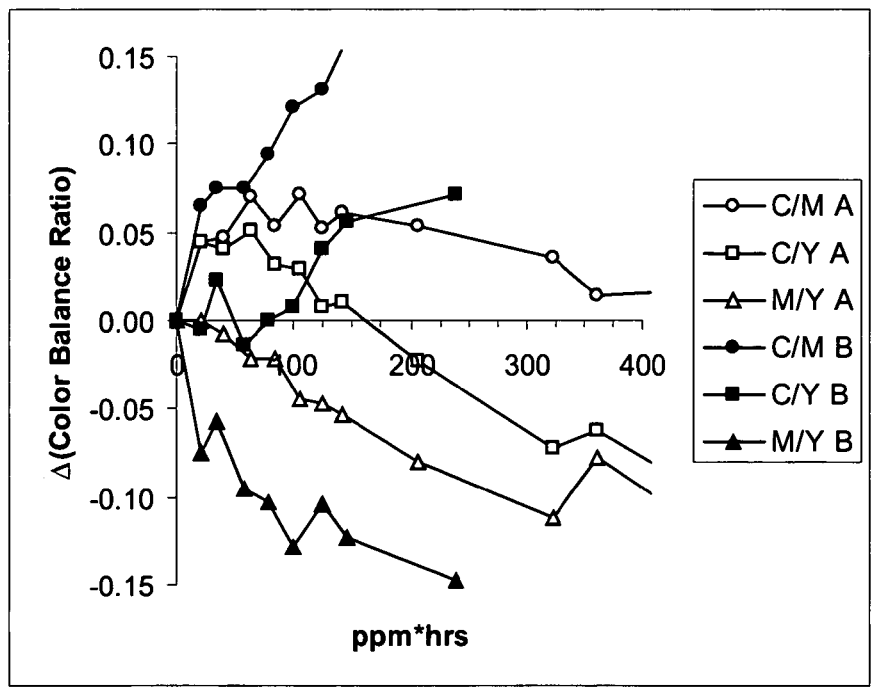

The results for ozone-fade are reported in FIGS. 4A through 5B. FIGS. 4A and 5A represent the data obtained as a result of the first set of plots while FIGS. 4B and 5B represent the data obtained as a result of the second set of plots. In each Figure, data denoted as "A" represents ink sets made according to the present invention; data denoted as "B" represents the comparative ink set; and "C","M",and "Y," represent, Cyan, Magenta, and Yellow; respectively. Comparative samples "B" in FIGS. 4 (A and B) through 5 (A and B), refer to Canon IP3000 and Canon Selphy DS700, respectively.

As can be seen from data in FIGS. 1 through 5, ink sets formulated according to the present invention were the only sets that exhibit uniform fading among cyan, magenta, and yellow within composite black for both light-fade and ozone-fade experiments. As can be further noted, in light-fade experiments, inks made according to the present invention also performed better than the other ink sets by approximately 40 years; while performing better, in ozone-fade experiments, than Canon IP3000, Canon Selphy DS700.

While particular forms of the invention have been illustrated and described herein, it will be apparent that various modifications and improvements can be made to the invention.

Moreover, individual features of embodiments of the invention may be shown in some drawings and/or examples, and not in others, but those skilled in the art will recognize that individual features of one embodiment of the invention can be combined with any or all the features of another embodiment. Accordingly, it is not intended that the invention be limited to the specific embodiments illustrated. It is intended that this invention be defined by the scope of the appended claims as broadly as the prior art will permit.

What is claimed is:

1. An ink set for use as an inkjet ink, comprising:
a cyan ink including a phthalocyanine compound represented by Formula I;
a magenta ink including an azo dye represented by Formula III; and
a yellow ink including a yellow dye containing 1,3-naphthalenedisulphonic acid, 7-[[4-[[4,6-bis-[(3-sulfoprop-1-yl)thio]-1,3,5-triazin-2-yl]amino]-3-methoxyphenyl]azo]tetrasodium salt represented by Formula V;
the cyan ink, the magenta ink, and the yellow ink together exhibiting uniform fade when printed together to form an image; wherein Formula I is shown below:

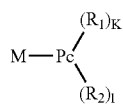

FORMULA I wherein
M represents a hydrogen atom, a metal atom; or an oxide, hydroxide, or halide thereof; and Pc represents a phthalocyanine nucleus;
wherein $R_1$ and $R_2$ each independently represents a substituent selected from the group consisting of —$SOX_1$, —$SO_2X_1$, $SO_2NX_2X_3$, —$SO_3X_4$;
$X_1$, $X_2$, $X_3$, and $X_4$ each independently represents a hydrogen atom, a substituted or unsubstituted alkyl group, a substituted or unsubstituted aryl group, or a substituted or unsubstituted heterocyclic group;
at least one of $R_1$ or $R_2$ has an ionic hydrophilic group as a substituent; and
k and l each independently represents an integer ranging from 1 to 3, provided that k and l each independently is selected such that k+l equals 4; and wherein Formula III is shown below:

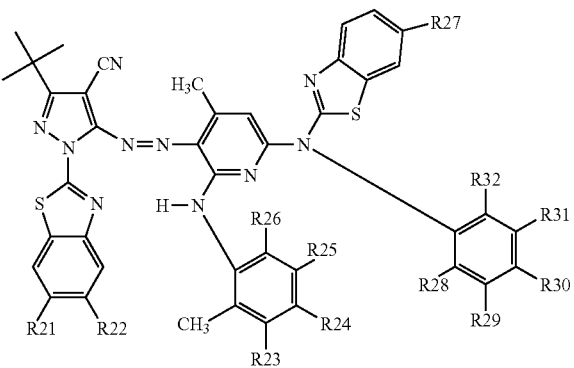

FORMULA III wherein
$R_{21}$, $R_{23}$, $R_{25}$, $R_{27}$, $R_{29}$, and $R_{31}$, are independently selected to be hydrogen atom or sulfonate group;
$R_{22}$ is selected to be hydrogen atom or nitro group;
$R_{26}$ and $R_{28}$ are independently selected to be hydrogen atom or methyl group;
$R_{24}$ and $R_{30}$ are independently selected to be a methyl or sulfonate group; and
$R_{32}$ is selected to be a methyl or methoxy group; and wherein Formula V is shown below:

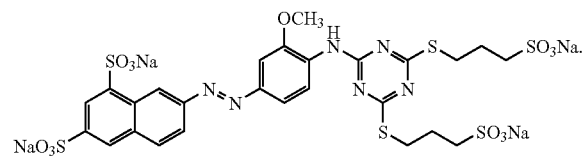

FORMULA V

2. An ink set according to claim 1, wherein:
$R_1$ equals
—SO—$(CH_2)_3$—$SO_3Z$, or
—$SO_2$—$(CH_2)_3$—$SO_3Z$;
$R_2$ equals
—$SO_2$—$(CH_2)_3$—$SO_2NH$—$C_2H_4OC_2H_4OH$, or
—$SO_2$—$(CH_2)_3$—$SO_2NH$—$CH_2CH(OH)CH_3$;
k is from 2 to 3; and
Z is lithium, sodium, potassium, ammonium, tetramethylammonium, or a mixture thereof.

3. An ink set according to claim 2, wherein:
$R_1$ equals
—$SO_2$—$(CH_2)_3$—$SO_3Z$;
$R_2$ equals
—$SO_2$—$(CH_2)_3$—$SO_2NH$—$CH_2CH(OH)CH_3$; and
k is 3; and
Z is lithium.

4. An ink set according to claim 1, wherein:
$R_{21}$, $R_{23}$, $R_{27}$, and $R_{31}$, are sulfonate groups;
$R_{22}$, $R_{25}$, and, $R_{29}$ are hydrogen atoms; and
$R_{24}$, $R_{26}$, $R_{28}$, $R_{30}$, and $R_{32}$ are methyl groups.

5. An ink set according to claim 1 wherein in Formula III:
$R_{21}$, $R_{23}$, $R_{27}$, and $R_{31}$, are sulfonate groups;
$R_{22}$, $R_{25}$, and, $R_{29}$ are hydrogen atoms; and
$R_{24}$, $R_{26}$, $R_{28}$, $R_{30}$, and $R_{32}$ are methyl groups.

6. An ink set according to claim 5 wherein the cyan ink further comprises AB9.

7. The ink set according to claim 3 wherein at least one of the cyan ink, the magenta ink, or the yellow ink further comprises a phenylenediamine compound derivative represented by Formula IV:

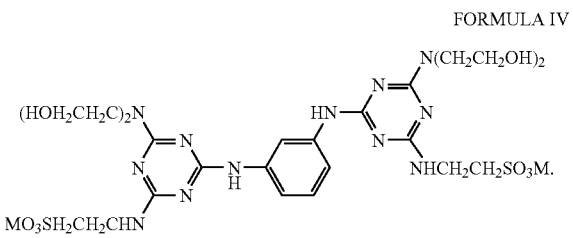

FORMULA IV

8. The ink set according to claim 7 wherein the phenylenediamine compound derivative is present in the cyan ink.

9. The ink set according to claim 4 wherein at least one of the cyan ink, the magenta ink, or the yellow ink further comprises a fluorocarbon surfactant formed at least in part from a polymer made based on oxetane chemistry generally being represented by Formula VI and including a pendant perfluoroalkyl group $R_f$:

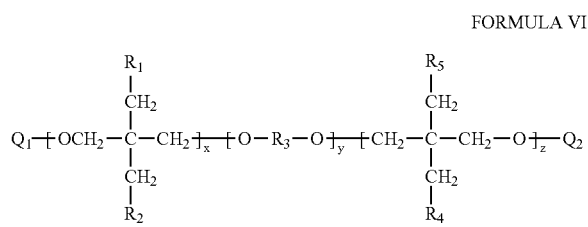

FORMULA VI wherein
$Q_1$ and $Q_2$ are independently selected from the group consisting of H, $SO_3^-W^+$, $COO^-W^+$, and COOH;
W is selected from the group consisting of $NH_4$, Li, Na, and K;
$R_1$, $R_2$, $R_4$, and $R_5$ are independently selected from the group consisting of H, OH, $O(CH_2)_m$—$(DF_2)_n$—$CF_3$; m=1-3 and n=0-3;
$R_3$ is selected from the group consisting of $(CH_2)_L$ and

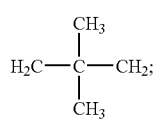

and
L=1-4; x=1-10; y=1-30; and z=1-10.

10. The ink set according to claim 9 wherein L=4; m=1; n=1; and $R_2$ and $R_4$=H.

11. The ink set according to claim 10 wherein the fluorocarbon surfactant is present in the magenta ink.

12. The ink set according to claim 10 wherein the phenylenediamine compound derivative concentration in the ink ranges from about 0.5 to about 5 wt. % based on the total weight of the ink.

13. The ink set according to claim 11 wherein the concentration of the fluorocarbon surfactant in the magenta ink ranges from about 0.1 to about 1 wt. % based on the total weight of the magenta ink.

14. A magenta ink for use as an inkjet ink, comprising:
a dye represented by Formula III:

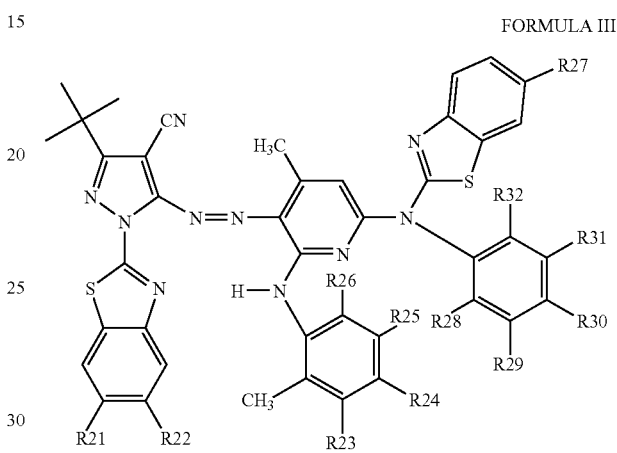

FORMULA III wherein
$R_{21}$, $R_{23}$, $R_{25}$, $R_{27}$, $R_{29}$, and $R_{31}$, are independently selected to be hydrogen atom or sulfonate group;
$R_{22}$ is selected to be hydrogen atom or nitro group;
$R_{26}$ and $R_{28}$ are independently selected to be hydrogen atom or methyl group;
$R_{24}$ and $R_{30}$ are independently selected to be a methyl or sulfonate group; and
$R_{32}$ is selected to be a methyl or methoxy group; and
a fluorocarbon surfactant formed at least in part from a polymer made based on oxetane chemistry generally being represented by Formula VI and including a pendant perfluoroalkyl group $R_f$:

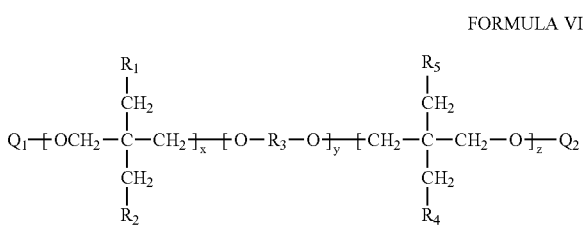

FORMULA VI wherein
$Q_1$ and $Q_2$ are independently selected from the group consisting of H, $SO_{3\_}W_+$, $COO\_W_+$, and COOH; W is selected from the group consisting of $NH_4$, Li, Na, and K;
$R_1$, $R_2$, $R_4$, and $R_5$ are independently selected from the group consisting of H, OH, $O(CH_2)_m$—$(CF_2)_n$—$CF_3$ m=1-3 and n=0-3;
$R_3$ is selected from the group consisting of $(CH_2)_L$ and

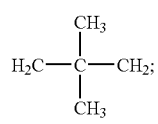
and
L=1-4; x=1-10; y=1-30; and z=1-10.
15. The magenta ink according to claim 14 wherein the dye and the fluorocarbon surfactant are added to the ink, respectively, in an amount ranging from about 2 to about 8 wt % and from about 0.1 to about 1.0 wt %, based on the total weight of the ink.
* * * * *

UNITED STATES PATENT AND TRADEMARK OFFICE
CERTIFICATE OF CORRECTION

PATENT NO. : 7,479,178 B2  Page 1 of 1
APPLICATION NO. : 11/348899
DATED : January 20, 2009
INVENTOR(S) : Tye J. Dodge et al.

It is certified that error appears in the above-identified patent and that said Letters Patent is hereby corrected as shown below:

In column 12, line 20, before "L" insert -- and --.

In column 16, line 46, in Claim 2, delete "An" and insert -- The --, therefor.

In column 16, line 59, in Claim 3, delete "An" and insert -- The --, therefor.

In column 17, line 1, in Claim 4, delete "An" and insert -- The --, therefor.

In column 17, line 3, in Claim 4, delete "and," and insert -- and --, therefor.

In column 17, line 5, in Claim 5, delete "An" and insert -- The --, therefor.

In column 17, line 7, in Claim 5, delete "and," and insert -- and --, therefor.

In column 17, line 7, in Claim 5, delete "$R_{29}$" and insert -- $R_{29}$, --, therefor.

In column 17, line 9, in Claim 6, delete "An" and insert -- The --, therefor.

In column 17, line 23, in Claim 7, delete "$NHCH_2CH_2SO_3M$." and
insert -- $NHCH_2CH_2SO_3M$ wherein M is sodium. --, therefor.

In column 18, line 3, in Claim 12, delete "claim 10" and insert -- claim 7 --, therefor.

In column 18, line 61, in Claim 14, delete "$SO_3.W_+$, $COO.W_+$," and
insert -- $SO_3^-W^+$, $COO^-W^+$, --, therefor.

In column 18, line 65, in Claim 14, delete "$CF_3$" and insert -- $CF_3$; --, therefor.

Signed and Sealed this

Fifteenth Day of June, 2010

David J. Kappos
*Director of the United States Patent and Trademark Office*